United States Patent [19]

DeMario

[11] Patent Number: 4,828,791

[45] Date of Patent: May 9, 1989

[54] NUCLEAR FUEL ASSEMBLY DEBRIS RESISTANT BOTTOM NOZZLE

[75] Inventor: Edmund E. DeMario, Columbia, S.C.

[73] Assignee: Westinghouse Electric Corp., Pittsburgh, Pa.

[21] Appl. No.: 104,748

[22] Filed: Oct. 5, 1987

[51] Int. Cl.[4] ............................................. G21C 1/04
[52] U.S. Cl. .................................. 376/352; 376/313; 376/434; 376/443
[58] Field of Search ................ 376/352, 313, 434, 443

[56] References Cited

U.S. PATENT DOCUMENTS

| | | | |
|---|---|---|---|
| 1,504,233 | 8/1924 | Graham | 376/313 |
| 3,389,056 | 6/1968 | Frisch | 376/352 |
| 3,791,466 | 2/1974 | Patterson et al. | 376/313 |
| 3,971,698 | 7/1976 | Wolff | 376/352 |
| 4,032,398 | 6/1977 | Cross et al. | 376/443 |
| 4,096,032 | 6/1978 | Mayers et al. | 376/313 |
| 4,198,272 | 4/1980 | Salmon | 376/175 |
| 4,427,624 | 1/1984 | Marlatt | 376/352 |
| 4,446,099 | 5/1984 | Schwind | 376/313 |
| 4,505,877 | 3/1985 | Rion | 376/352 |
| 4,664,880 | 3/1987 | Bryan | 376/313 |
| 4,678,627 | 7/1987 | Rylatt | 376/313 |
| 4,684,495 | 8/1987 | Wilson | 376/313 |
| 4,684,496 | 8/1987 | Wilson | 376/313 |

FOREIGN PATENT DOCUMENTS 54-102493 8/1979 Japan .
54-141989 11/1979 Japan .
1214998 12/1970 United Kingdom .

Primary Examiner—Donald P. Walsh

[57] ABSTRACT

A debris resistant bottom nozzle in a fuel assembly has a support structure in the form of four legs adapted to rest on a lower core plate of a nuclear reactor and a top flat plate fixed on one side of the four legs facing upwardly toward a lowermost grid of the fuel assembly. The flat plate is of a substantially solid configuration with a plurality of spaced cut-out regions defined therethrough in alignment with and directly above a plurality of inlet liquid coolant flow holes in the lower core plate. A plurality of open separate criss-cross structures are provided, each being fixed to the plate and extending across one of the cut-out regions therein within the plane of the plate. The criss-cross structures define individual openings small enough in cross-sectional size to filter debris of damage-inducing size which otherwise collects in unoccupied spaces of the lowermost grid of the fuel assembly, but large enough in size to let pass debris of nondamage-inducing size which otherwise passes through the unoccupied spaces of the lowermost grid. The criss-cross structure in one embodiment is in the form of a plurality of interleaved straps forming an open grid structure, and in another embodiment is in the form of a plurality of interconnected crossed wires forming an open mesh structure. Also, at least one pressure drop reducing flow hole is defined in the plate at a location spaced from the cut-out regions.

14 Claims, 5 Drawing Sheets

NUCLEAR FUEL ASSEMBLY DEBRIS RESISTANT BOTTOM NOZZLE

CROSS REFERENCE TO RELATED APPLICATIONS

Reference is hereby made to the following copending patent applications dealing with related subject matter and assigned to the assignee of the present invention:

1. "Debris Trap For A Pressurized Water Nuclear Reactor" by John F. Wilson et al, assigned U.S. Ser. No. 672,040 and filed Nov. 16, 1984.
2. "Fuel Assembly Bottom Nozzle With Integral Debris Trap" by John F. Wilson et al, assigned U.S. Ser. No. 672,041 and filed Nov. 16, 1984.
3. "Wire Mesh Debris Trap For A Fuel Assembly" by William Bryan, assigned U.S. Ser. No. 679,511 and filed Dec. 7, 1984.
4. "Debris-Retaining Trap For A Fuel Assembly" by John A. Rylatt, assigned U.S. Ser. No. 720,109 and filed Apr. 4, 1985.
5. "Bottom Grid Mounted Debris Trap For A Fuel Assembly" by Harry M. Ferrari et al, assigned U.S. Ser. No. 763,737 and filed Aug. 8, 1985.
6. "Nuclear Fuel Assembly Debris Filter Bottom Nozzle" by John M. Shallenberger et al, assigned U.S. Ser. No. 046,219 and filed May 5, 1987.

BACKGROUND OF THE INVENTION

1. Field of the Invention

The present invention relates generally to nuclear reactors and, more particularly, is concerned with a debris resistant bottom nozzle in a nuclear fuel assembly.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the systems. most of the debris consists of metal turnings which were probably left in the primary system after steam generator repair or replacement.

In particular, fuel assembly damage due to debris trapped at the lowermost grid has been noted in several reactors in recent years. Debris enters through the fuel assembly bottom nozzle flow holes from the coolant flow openings in the lower core support plate when the plant is started up. The debris tends to become lodged in the lowermost support grid of the fuel assembly within the spaces between the "egg-crate" shaped cell walls of the grid and the lower end portions of the fuel rod tubes. The damage consists of fuel rod tube perforations caused by fretting of debris in contact with the exterior of the tube. Debris also becomes entangled in the nozzle plate holes and the flowing coolant causes the debris to gyrate which tends to cut through the cladding of the fuel rods.

Several different approaches have been proposed and tried for carrying out removal of debris from nuclear reactors. Many of these approaches are discussed in U.S. Pat. 4,096,032 to Mayers et al. Others are illustrated and described in the first five U.S. patent applications cross-referenced above. While all of the approaches described in the cited patent and patent applications operate reasonably well and generally achieve their objectives under the range of operating conditions for which they were designed, a need still exists for a fresh approach to the problem of debris filtering in nuclear reactors. The new approach must be compatible with the existing structure and operation of the components of the reactor, and at least provide overall benefits which outweigh the costs it adds to the reactor.

SUMMARY OF THE INVENTION

The present invention provides a debris resistant bottom nozzle in a fuel assembly designed to satisfy the aforementioned needs. The bottom nozzle of the present invention includes a substantially solid flat plate having spaced cut-out regions aligned directly above inlet holes of the lower core plate and open criss-cross structures fixed to the plate and extending across the regions. The criss-cross structures define individual openings small enough in cross-sectional size to filter out debris of damaging-inducing size which otherwise collects primarily in the sections of the fuel assembly between the bottom nozzle and the lowermost grid and in the unoccupied spaces of the lowermost grid and causes fuel rod fretting failures. The criss-cross structures also have structural portions which support the lower ends of guide thimbles aligned with these regions of the bottom nozzle plate.

Accordingly, the present invention is directed to a debris resistant bottom nozzle useful in a fuel assembly for a nuclear reactor wherein the fuel assembly includes a plurality of nuclear fuel rods, at least a lowermost grid supporting the fuel rods in an organized array and having unoccupied spaces defined therein allowing flow of liquid coolant therethrough. The debris resistant bottom nozzle is disposed adjacent to and below the grid and below lower ends of the fuel rods. The bottom nozzle comprises: (a) support means adapted to rest on the lower core plate of the nuclear reactor; (b) a plate fixed on the support means and being of a substantially solid configuration with a plurality of spaced cut-out regions therein adapted to align directly above inlet holes in the lower core plate; and (c) a plurality of open separate criss-cross structures, each of the criss-cross structures fixed to the plate and extending across one of the cut-out regions therein. The criss-cross structures define individual openings small enough in cross-sectional size to filter out debris of damage-inducing size which otherwise collects in unoccupied spaces of a lowermost grid of the fuel assembly, but large enough in size to let pass debris of nondamage-inducing size which otherwise passes through the unoccupied spaces of the lowermost grid.

More particularly, each of said cut-out regions is approximately of the same size as each of the inlet holes in the lower core plate. Also, at least one guide thimble lower end supporting structure is provided, extending into the cut-out region and fixed to the plate and cross-cross structure.

In one embodiment, the cross-cross structure is in the form of a plurality of interleaved straps forming an open grid structure. In another embodiment, the cross-cross structure is in the form of a plurality of interconnected crossed wires forming an open mesh structure. Optionally, at least one pressure drop reducing flow hole can be defined in the plate at a location spaced from the cut-out regions.

These and other advantages and attainments of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings in which.

DETAILED DESCRIPTION OF THE INVENTION

Figure 1:
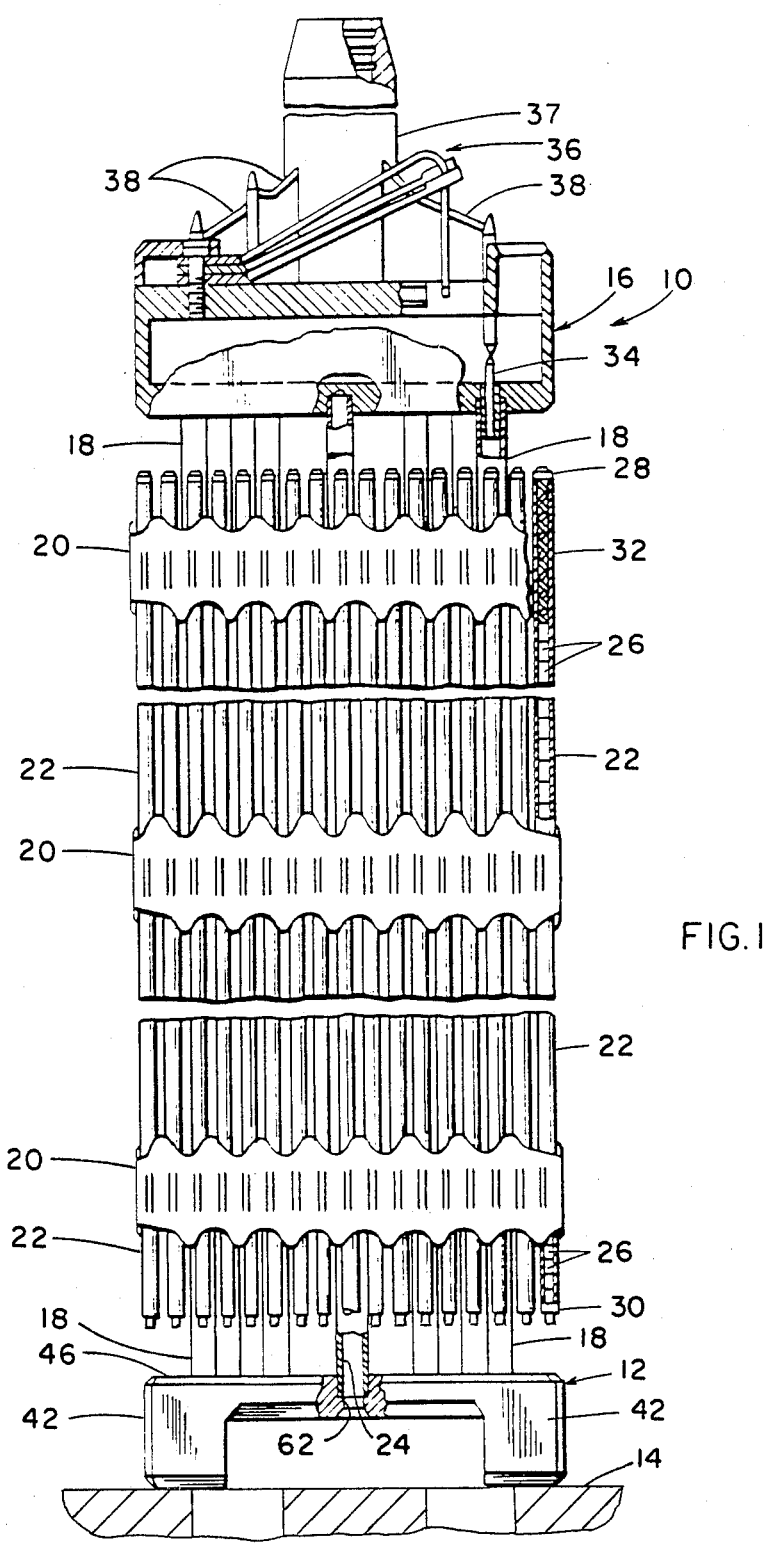
FIG. 1 is an elevational view, partly in section, of a fuel assembly which incorporates the debris resistant bottom nozzle of the present invention, the assembly being illustrated in vertically fore-shortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor and has a structural skeleton which at its lower end includes the debris resistant bottom nozzle 12 of the present invention (which will be described later in detail). The bottom nozzle 12 supports the fuel assembly 10 on a lower core support plate 14 in the core region of a reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12,16 and at opposite ends are rigidly attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the assembly 10 has an instrumentation tube 24 located in the center thereof and extending between and mounted to the bottom and top nozzles 12,16. With such an arrangement of parts, the fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28,30. The pellets 26 are maintained in a stack thereof by a plenum spring 32 disposed between the upper end plug 28 and the top of the pellet stack. The fuel pellets 26 composed of fissile material are responsible for creating the reactive power of the reactor. A liquid moderator/coolant such as water, or water containing boron, is pumped upwardly through a plurality of flow openings in the lower core plate 14 to the fuel assembly. The bottom nozzle 12 of the fuel assembly 10 passes the coolant flow upwardly through the guide thimbles 18 and along the fuel rods 22 of the assembly in order to extract heat generated therein for the production of useful work.

To control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially extending flukes or arms 38. Each arm 38 is interconnected to a control rod 34 such that the control mechanism 36 is operable to move the control rods vertically in the guide thimbles 18 to thereby control the fission process in the fuel assembly 10, all in a well-known manner.

Debris Resistant Bottom Nozzle

As mentioned above, fuel assembly damage due to debris trapped at or below the lowermost one of the grids 20 has been found to be a problem. Therefore, to prevent occurrence of such damage, it is highly desirable to prevent this debris from passing through the bottom nozzle flow holes.

The present invention relates to a bottom nozzle 12, which in addition to supporting the fuel assembly 10 on the lower core support plate 14, also contains features which function to filter out potentially damage-inducing size debris from the coolant flow passed upwardly through the bottom nozzle. The bottom nozzle 12 includes support means in the form of a plurality of corner legs 42 for supporting the fuel assembly 10 on the lower core plate 14 and a top, generally rectangular planar flat plate 46 suitably attached, fixed, such as by welding, to the corner legs 42.

Figure 2:
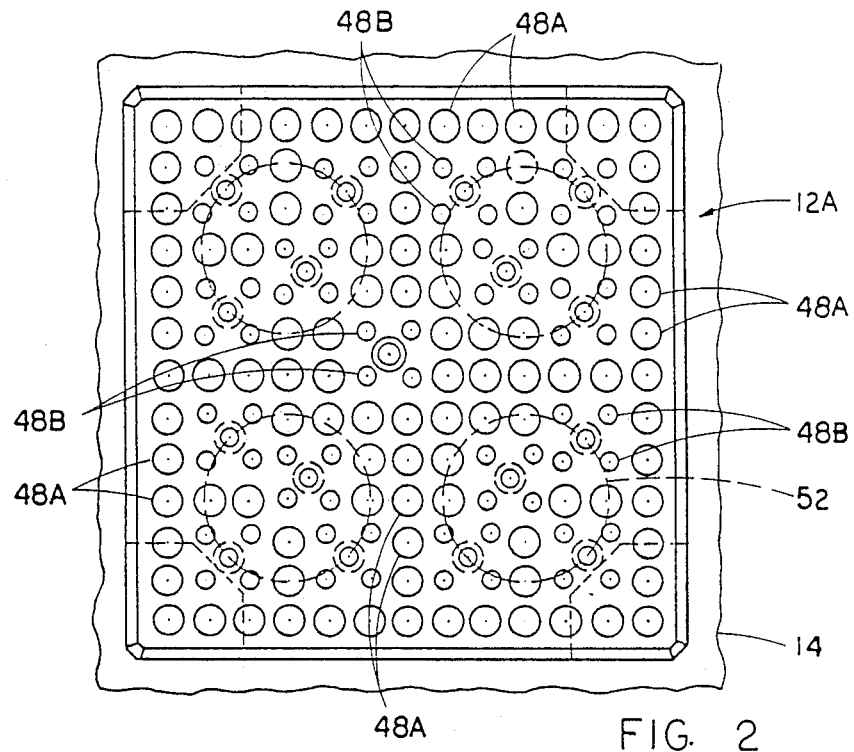
FIG. 2 is a top plan view of a prior art bottom nozzle showing a pattern of circular flow holes in its transverse top plate having different large diameter sizes.

As seen in FIG. 2, the prior art bottom nozzle 12A has a plate 46A with a large number of relatively large flow holes 48A,48B of two different diameter sizes therein (for instance 0.25 and 0.50 inch). The flow holes 48A,48B are large enough in their respective diameters to pass the damage-inducing size debris typically carried in the liquid coolant flow.

Figure 3:
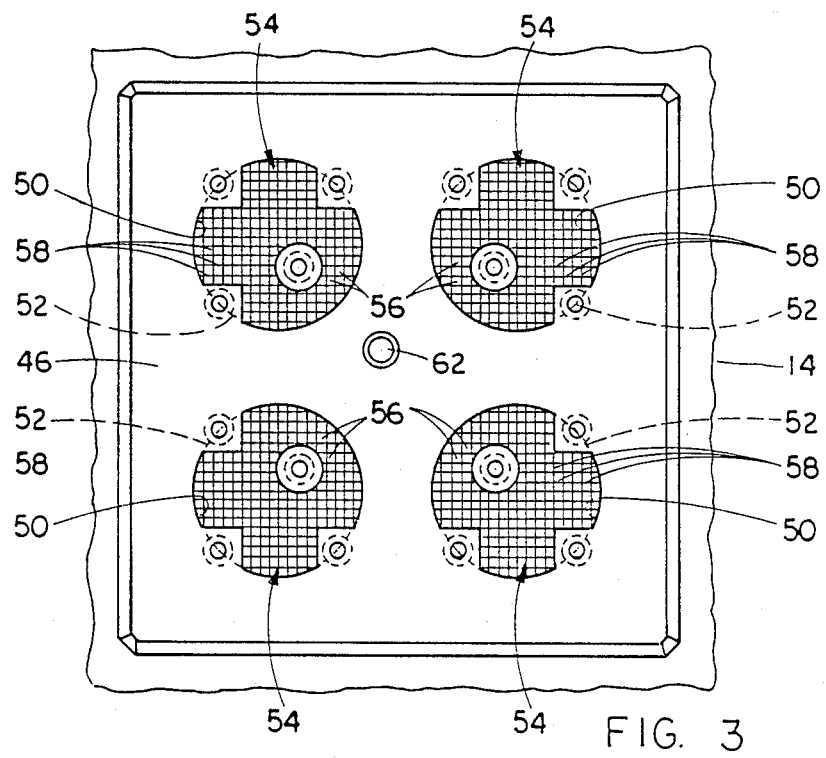
FIG. 3 is an enlarged top plan view of the debris resistant bottom nozzle of the fuel assembly of FIG. 1, showing the solid plate having spaced cut-out regions aligned directly above inlet holes of a lower core plate and open criss-cross structures in the form of grid structures fixed to the plate and extending across the regions.
Figure 4:
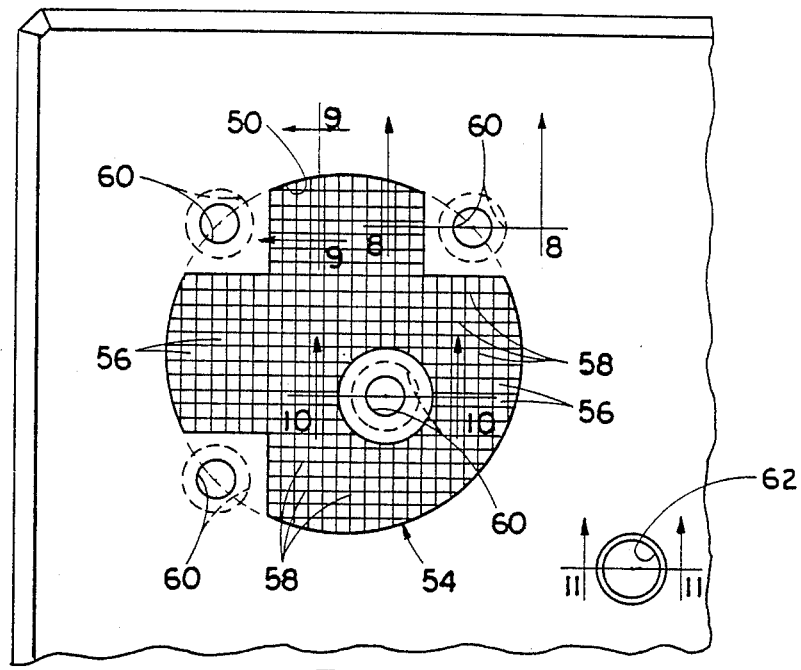
FIG. 4 is an enlarged top plan view of the upper left hand corner of the debris resistant bottom nozzle of FIG. 3, showing one of the cut-out regions and criss-cross structures and the cup-shaped structural portions therein for supporting guide thimble lower ends.
Figure 6:
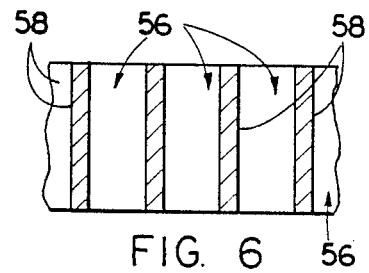
FIG. 6 is a cross-sectional view of the bottom nozzle criss-cross structure taken along line 6—6 of FIG. 5.

Turning now to FIGS. 3 and 4, it can be seen that the top plate 46 of the debris resistant bottom nozzle 12 of the present invention is of a substantially solid configuration, closed to the flow of liquid coolant therethrough, except for a plurality of spaced cut-out regions 50 defined therethrough. The cut-out regions 50 are located in alignment with and directly above the plurality of inlet liquid coolant flow holes 52 of the lower core plate 14. Each of the cut-out regions 50 is approximately of the same size as each of the inlet holes 52 in the lower core plate 14.

The debris resistant bottom nozzle 12 also includes a plurality of separate, open criss-cross structures 54. Each of the criss-cross structures 54 is fixed, such as by welding, to the plate 46 and extends across one of the cut-out regions 50 therein within the plane of the plate 46. The criss-cross structures 54 define individual openings 56 therethrough, for example being square-shaped in cross section, which are small enough in cross-sectional size to filter out debris of damage-inducing size which otherwise collects in unoccupied spaces of the lowermost grid 20 of the fuel assembly 10, but large enough in size to let pass debris of nondamage-inducing size which otherwise passes through the unoccupied spaces of the lowermost grid 20. Therefore, any debris being carried by the liquid coolant flow which is small enough to pass through the criss-cross structure openings 56 will also pass through the unoccupied grid spaces, whereas any debris being carried by the liquid coolant which is large enough to not pass through the unoccupied grid spaces and collect in the grid 20 will not pass through the criss-cross structure openings 56.

Observations have shown that debris-induced fuel rod failures were at or below the lowermost grid and appeared to be caused by debris somewhat larger than 0.190 inch in width. Thus, openings 56 through the structures 54 of sizes less than 0.190 inch at their longest dimension should substantially reduce the percentage of potential rod-damaging debris carried into the fuel assembly 10 by the primary coolant flow.

In the preferred embodiment shown in Figs. 3-10, the criss-cross structure 54 is in the form of a plurality of spaced and interleaved straps 58 forming an open grid structure. In their height dimensions, the horizontal straps 58 extend in vertical planes generally parallel to the direction of coolant flow through the open grid structure. The openings 56 defined by the interleaved straps 58 are in the form of open vertically extending channels which allow passage of coolant flow with very slight pressure drop. The straps 58 also serve to block the path of any fuel rods 22 which happen to loosen from the grip imposed by the springs and dimples (not shown) of the grids 20 and drop down on the top of the bottom nozzle plate 46.

Figure 10:
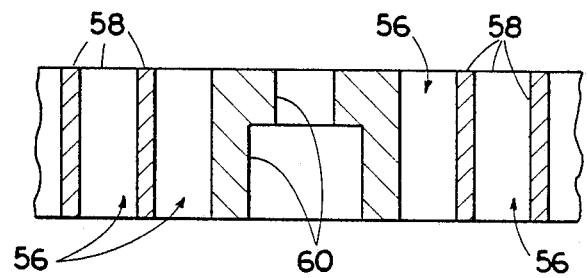
FIG. 10 is an enlarged cross-sectional view of a fragmentary portion of the criss-cross structure and double bore-defining structural portion therein taken along line 10—10 of FIG. 4.
Figure 11:
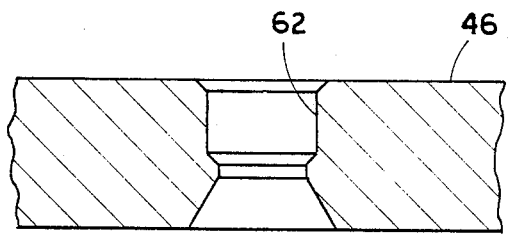
FIG. 11 is an enlarged cross-sectional view of a fragmentary portion of the bottom nozzle plate taken along line 11—11 of FIG. 4, showing the instrumentation tube hole in the plate.

As also seen in FIGS. 3, 4, 8, 10 and 12, the criss-cross structure 54 of the debris resistant bottom nozzle 12 includes several double bore-defining structures 60 within the cut-out regions 50 for supporting the lower ends of the ones of the guide thimbles 18 which overlie the cut-out regions 50. The double bore-defining structures 60 are fixed to the plate 46 and structure 54 both at the intersection of the structure 54 and the plate 46 and within the structure 54 itself. The structure 60 fixed totally within the criss-cross structure 54 is in the form of a sleeve, as shown in FIGS. 3, 4 and 10. FIGS. 1, 3, 4, 11 and 12 also illustrate a hole 62 in the center of the plate 46 within which the lower end of the instrumentation tube 24 is anchored.

Figure 5:
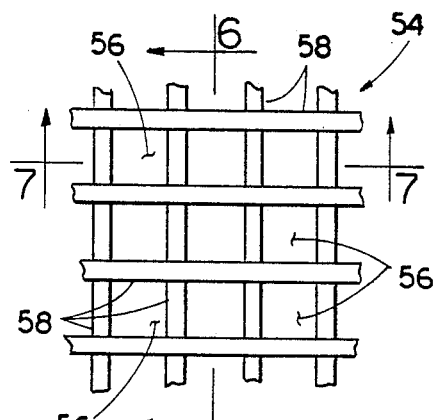
FIG. 5 is an enlarged top plan view of a fragmentary portion of one of the grid-type cross-cross structures of the debris resistant bottom nozzle of FIG. 3.
Figure 5A:
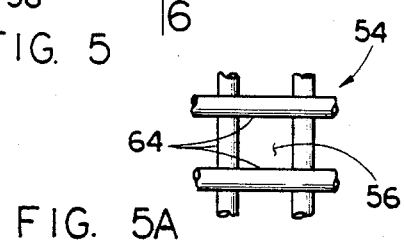
FIG. 5A is an enlarged top plan view of a fragmentary portion of an alternative criss-cross structure in the form of a wire mesh or screen structure.
Figure 7:
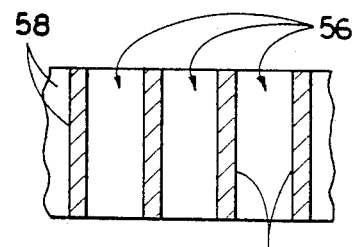
FIG. 7 is another cross-sectional view of the bottom nozzle criss-cross structure taken along line 7—7 of FIG. 5.
Figure 8:
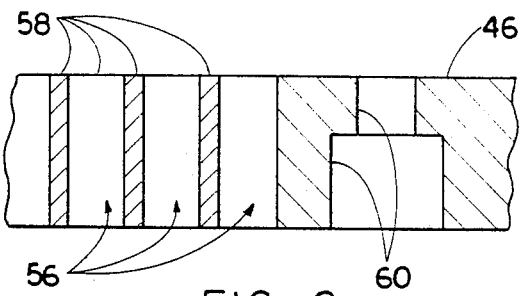
FIG. 8 is an enlarged cross-sectional view of a fragmentary portion of the bottom nozzle plate and criss-cross structure taken along line 8—8 of FIG. 4.
Figure 9:
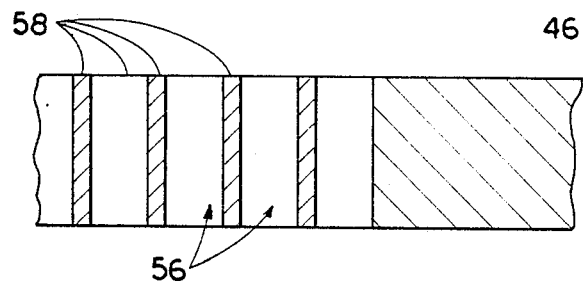
FIG. 9 is an enlarged cross-sectional view of another fragmentary portion of the bottom nozzle plate and criss-cross structure taken along line 9—9 of FIG. 4.

In an alternative embodiment shown in FIG. 5A, the criss-cross structure 54 can take the form of a plurality of interconnected, crossed and spaced wires 64 forming an open mesh structure. The openings 56 are defined between the wires 64 and are square in cross section. The wires 64 might be used in those bottom nozzle configurations wherein the cut-out regions 50 are not aligned with guide thimbles and thus no guide thimble lower end supporting structure would be necessary.

Figure 12:
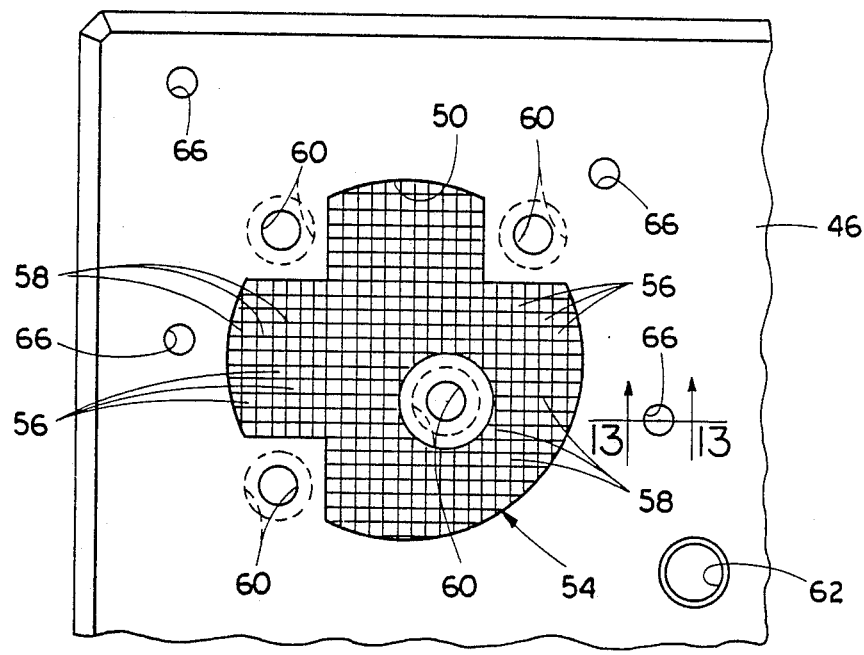
FIG. 12 is a view similar to that of FIG. 4, but showing several additional pressure drop reducing flow holes defined through the bottom nozzle plate.
Figure 13:
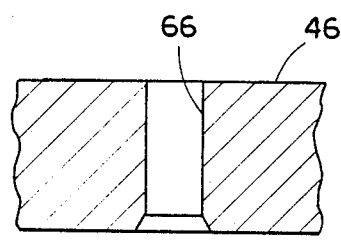
FIG. 13 is an enlarged cross-sectional view of a fragmentary portion of the bottom nozzle plate taken along line 13—13 of FIG. 12, showing one of the pressure drop reducing flow holes in the plate.

Finally, should the pressure drop of the debris resistant bottom nozzle 12 increase more than tolerable upon employment of the cut-out regions 50 and criss-cross structures 54 in the bottom nozzle 12, at least one and probably several pressure drop reducing flow holes 66 can be drilled through the plate 46 at locations spaced from the cut-out regions 50, as shown in FIG. 12 and 13.

It is thought that the present invention and many of its attendant advantages will be understood from the forefoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

I claim:

1. A debris resistant bottom nozzle useful in a fuel assembly for a nuclear reactor, said bottom nozzle comprising:
   (a) support means adapted to rest on a lower core plate of a nuclear reactor; and
   (b) a plate fixed on said support means and being of a substantially solid configuration with a plurality of spaced cut-out regions therein adapted to align directly above inlet holes in the lower core plate; and
   (c) a plurality of open separate criss-cross structures, each of said criss-cross structures fixed to said plate and extending across one of said cut-out regions therein, said criss-cross structures defining individual openings small enough in cross-sectional size to filter out debris of damage-inducing size larger than 0.190 inch in width otherwise collects in unoccupied spaces of a lowermost grid of the fuel assembly, but large enough in size to let pass debris of nondamage-inducing size which otherwise passes through the unoccupied spaces of the lowermost grid.

2. The bottom nozzle as recited in claim 1, wherein each of said cut-out regions is approximately of the same size as each of the inlet holes in the lower core plate.

3. The bottom nozzle as recited in claim 1, further comprising:
(d) at least one guide thimble lower end supporting structure extending into said cut-out region and fixed to said plate and said criss-cross structure.

4. The bottom nozzle as recited in claim 1, further comprising:
(d) at least one guide thimble lower end supporting structure disposed within said cut-out region and fixed to said criss-cross structure.

5. The bottom nozzle as recited in claim 1, wherein said criss-cross structure is in the form of a plurality of interleaved straps forming an open grid structure.

6. The bottom nozzle as recited in claim 1, wherein said criss-cross structure is in the form of a plurality of interconnected crossed wires forming an open mesh structure.

7. The bottom nozzle as recited in claim 1, further comprising:
(d) at least one pressure drop reducing flow hole defined in said plate at a location spaced from said cut-out regions.

8. In a fuel assembly for a nuclear reactor, said reactor including a lower core plate having a plurality of inlet liquid coolant flow holes and said fuel assembly including a plurality of nuclear fuel rods, at least a lowermost grid supporting said fuel rods in an organized array and having unoccupied spaces defined therein allowing flow of liquid coolant therethrough and a debris resistant bottom nozzle disposed above said inlet flow holes of said lower core plate and adjacent to and below said grid and below lower ends of said fuel rods, said debris resistant bottom nozzle comprising:
(a) support means adapted to rest on said lower core plate of the nuclear reactor;
(b) a generally flat plate fixed on said support means facing toward said lowermost grid and being of a substantially solid configuration with a plurality of spaced cut-out regions defined therethrough in alignment with and directly above said plurality of inlet liquid coolant flow holes of said lower core plate; and
(c) a plurality of open separate criss-cross structures, each of said criss-cross structures being fixed to said plate and extending across one of said cut-out regions therein within the plane of said plate, said criss-cross structures defining individual openings small enough in cross-sectional size to filter out debris of damage-inducing size larger than 0.190 inch in width which otherwise collects in unoccupied spaces of said lowermost grid of said fuel assembly such that any debris being carried by the liquid coolant flow which is small enough to pass through said criss-cross structure openings will also pass through said unoccupied grid spaces, whereas any debris being carried by the liquid coolant which is large enough to not pass through said unoccupied grid spaces and collect in said grid will not pass through said criss-cross structure openings.

9. The bottom nozzle as recited in claim 8, wherein each of said cut-out regions is approximately of the same size as each of said inlet holes in said lower core plate.

10. The bottom nozzle as recited in claim 9, further comprising:
(d) at least one guide thimble lower end supporting structure extending into said cut-out region and fixed to said plate and said criss-cross structure.

11. The bottom nozzle as recited in claim 8, further comprising:
(d) at least one guide thimble lower end supporting structure disposed within said cut-out region and fixed to said criss-cross structure.

12. The bottom nozzle as recited in claim 8, wherein said criss-cross structure is in the form of a plurality of interleaved straps forming an open grid structure.

13. The bottom nozzle as recited in claim 8, wherein said criss-cross structure is in the form of a plurality of interconnected crossed wires forming an open mesh structure.

14. The bottom nozzle as recited in claim 8, further comprising:
(d) at least one pressure drop reducing flow hole defined in said plate at a location spaced from said cut-out regions.

* * * * *